(12) United States Patent
Olgiati

(10) Patent No.: US 9,858,199 B1
(45) Date of Patent: Jan. 2, 2018

(54) MEMORY MANAGEMENT UNIT FOR SHARED MEMORY ALLOCATION

(71) Applicant: Amazon Technologies, Inc., Seattle, WA (US)

(72) Inventor: Andrea Olgiati, Gilroy, CA (US)

(73) Assignee: Amazon Technologies, Inc., Seattle, WA (US)

( * ) Notice: Subject to any disclaimer, the term of this patent is extended or adjusted under 35 U.S.C. 154(b) by 72 days.

(21) Appl. No.: 15/085,660

(22) Filed: Mar. 30, 2016

(51) Int. Cl.
  *G06F 12/10* (2016.01)
  *G06F 12/1009* (2016.01)
  *G06F 12/02* (2006.01)

(52) U.S. Cl.
  CPC ........ *G06F 12/1009* (2013.01); *G06F 12/023* (2013.01); *G06F 2212/1044* (2013.01); *G06F 2212/152* (2013.01)

(58) Field of Classification Search
  None
  See application file for complete search history.

(56) References Cited

U.S. PATENT DOCUMENTS

| 2003/0093487 A1* | 5/2003 | Czajkowski | ........ G06F 9/44521 709/213 |
| 2011/0161620 A1* | 6/2011 | Kaminski | ........... G06F 12/1009 711/207 |

* cited by examiner

*Primary Examiner* — John A Lane
(74) *Attorney, Agent, or Firm* — Baker & Hostetler LLP

(57) ABSTRACT

A system and method for allocating shared inter-process memory by a memory management unit is disclosed. A memory management unit may receive information indicative of allocating a region of shared memory. The information may further indicate that a second process may share access to the memory. The memory management unit may identify corresponding regions of virtual address space for each process, such that the region in each address space maps to the same range of addresses. The memory management unit may virtualize access to the shared memory by mapping from the corresponding regions of the virtual address space.

20 Claims, 9 Drawing Sheets

MEMORY MANAGEMENT UNIT FOR SHARED MEMORY ALLOCATION

BACKGROUND

Computing devices may typically include a memory management unit which virtualizes access to the computing device's physical memory. Typically, a process that executes on a computing device is associated with a dedicated virtual address space which is then mapped, through a virtualization process, to a portion of physical memory exclusively assigned to the process. Each process thus has its own dedicated virtual address space.

Separate processes that execute on a computing device may sometimes communicate with each other through shared memory. Typically, a number of processes may read from or write to the same region of physical memory in order to allow the data written to the physical memory to be accessed by the separate processes. A computing device may comprise a memory management unit that controls access to the shared region of physically memory. Typically, access to the shared physical memory is virtualized independently for each process, so that the shared physical memory is represented within each process may correspond to a different region of virtual memory.

BRIEF DESCRIPTION OF DRAWINGS

The following detailed description may be better understood when read in conjunction with the appended drawings. For the purposes of illustration, various examples of aspects of the disclosure are shown in the drawings; however, the invention is not limited to the specific methods and instrumentalities disclosed.

DETAILED DESCRIPTION

Figure 1:
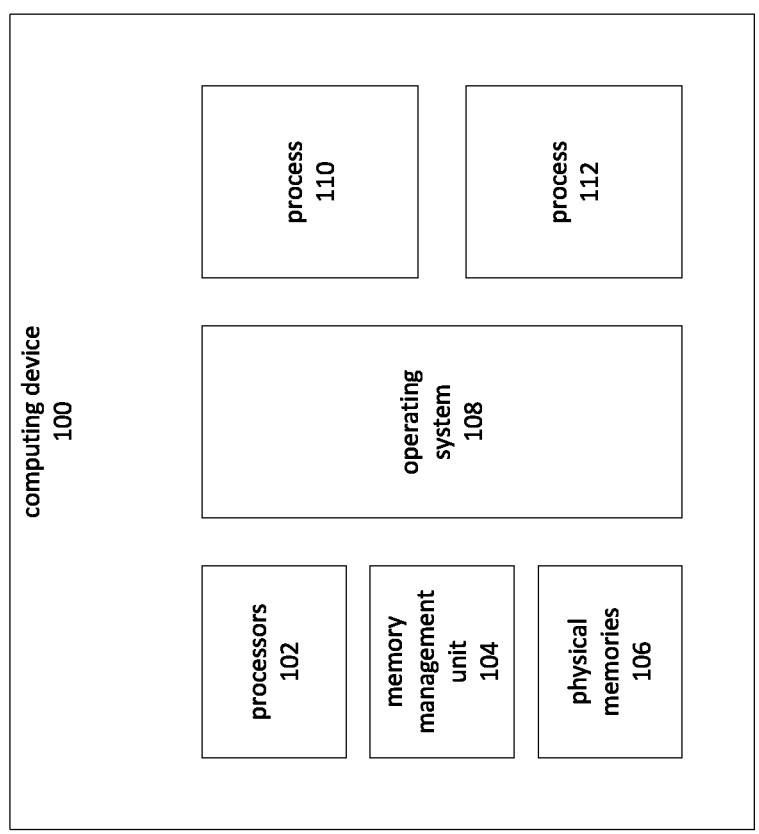
FIG. 1 is a block diagram depicting a computing device with a memory management unit adapted for shared memory allocation.

Disclosed herein are systems, methods, and computer program products pertaining to memory management using a memory management unit. In a computing system, a memory management unit is typically responsible for virtualizing access to physical memory, so that each process executing on the computing device may have its own, independent view of memory. Each process thus has an independent address space which is then mapped, or virtualized, onto physical memory. In most instances, physical memory is reserved for the exclusive use of a single process at any one time.

Shared memory may involve permitting multiple processes to access the same portion of physical memory. In such cases, a memory management unit may map a portion of each process's address space onto the shared portion of physical memory. Typically, references to memory originate from a processor and pass through the memory management unit in order to be translated from a virtual memory address to a physical memory address. Once an address has been translated from a virtual address to a physical address, the contents of the physical memory may be retrieved and provided to the processor. This process may be described as virtualizing access to memory. Memory management units may also perform functions such as interacting with and utilizing cache memory, performing bus arbitration, and providing memory protection. Memory management units may also include or interact with a translation lookaside buffer, which may cache previous translations from virtual to physical addresses.

Conventional memory management units are typically not adapted to provide access shared memory. For example, a conventional memory management unit may map virtual memory addresses to physical address spaces without regard to how the memory will be used. Memory management units may be used to provide per-process address spaces, such that the memory management unit provides a unique virtual address space to each process and then arbitrates usage of the physical memory between processes. Because the memory management unit maps each virtual address space onto physical memory independently, each process maintains a different view of memory even when it is shared between processes. This may make it more difficult to share pointers to the shared memory between processes, since each process has a different view of the same portion of physical memory.

Moreover, typical approaches to shared memory may require that the shared physical memory be contiguous. When contiguity is required, allocating shared memory regions may present various issues. For example, there may not be a contiguous reason of sufficient size that is available to allocate. In other cases, regions of contiguous memory may degrade allocation performance, for at least the reason that it a contiguous region of physical memory may interfere with defragmentation of the physical memory.

In an example, a memory management unit may receive a message containing information indicating that memory is to be allocated on behalf of a process. The message may further indicate that the memory is to be shareable with more additional processes. The message may, in some instances, include a list of processes that are to be permitted access to the shared memory. In others a flag or other data element may be used to indicate that the requested memory is intended to be shared with at least one other process.

The memory management unit may identify a suitable region of virtual address space for the requesting process. The suitable region is of sufficient size, and has a corresponding region in the address space of each process that is permitted to access the shared region of physical memory. The corresponding regions in the address space of each process occupy the same set of addresses. In other words, they map to the same virtual addresses. Typically, the memory management unit may maintain a bitmap representation of allocated pages in each virtual address space. A logical OR operation between the bitmap representations may be used to identify regions which have not yet been, or are not currently, allocated in any of the address space. By identifying such regions of suitable size, an appropriate range of virtual addresses may be identified.

Having identified a suitable range of virtual addresses, the memory management unit may virtualize access to the shared memory by translating addresses in the assigned region to the shared region of physical memory. Because each process utilizes the same mapping, further translation between virtual address spaces is not typically needed. Moreover, pointers stored in the shared region of physical memory may not require translation to a different address space, provided they refer to a location within the commonly shared virtual address space. In addition, the virtualization may also permit the corresponding region of physical memory to be discontiguous, In an example, a computing device may comprise one or more processer, such as a central processing unit ("CPU"), one or more memories such as random access memory, and a memory management unit. In some instances, the memory management unit may be integrated into the CPU. The processors may perform instructions stored in the memories, and thereby cause the computing device to perform operations for providing access to shared memory. The operations may comprise receiving, at the memory management unit, information indicative of allocating a portion of a first virtual address space of a first process that is executing on the computing device. This may for example, comprise a request to allocate or otherwise reserve a portion of the virtual address space. The requested portion may be associated with a minimum size—for example, the request may specify that at least X number of bytes should be allocated. The request may also include data that indicates that the data may be shared with at least a second process. This data may include, for example, a list of processes that may be permitted to access the shared memory region.

The operations may further comprise identifying a first region of the virtual address space associated with a first process, and identifying a second region of a second virtual address space associated with the second process. Both the first region and the second region are at least the minimum size and are unallocated. Moreover, addresses of the first region in the first virtual address space are equivalent to addresses of the second region in the second virtual address space. It might be that the two sizes are unequal, but are at least as large as the amount of memory that is to be shared between the two (or more) processes. Addresses within that range are equivalent and, in various instances, continuous.

The operations may further comprise virtualizing access to a physical memory region corresponding to the first region of the first virtual address space and the second region of the second virtual address space. The virtualization may comprise translating an address in the first region of the first virtual address space to a location in the physical memory, and translating an equivalent address in the second region of the second virtual address space to the location. As a result, both the first and second processes may access the shared region without having to translate virtual addresses between the first and second address spaces.

A further example is provided by FIG. 1, which is a block diagram depicting a computing device with a memory management unit adapted for shared memory allocation. A computing device 100 may comprise one or more processors 102, a memory management unit 104, one or more physical memories 106, and an operating system 108.

Various processes 110, 112 may be executing on the computing device 100. The processes 110, 112 may correspond to an application program, a system background program, and so forth. The term process may refer to a program, such as an application program or system background program that is being executed by one of the processors 102. The processes 110, 112 will, typically, use memory allocated on their behalf by the operation of the processors 102 and the memory management unit 104. Typically, memory used by one process 110 will not be shared by any other process 112. However, in some cases a process 110 will share memory with another process 112.

The memory management unit 104 virtualizes access to physical memory 106. Typically, the memory management unit 104 maintains an independent virtual address space for each individual process 110, 112. For example, the memory management unit 104 may maintain a first virtual address space for a first process 110, and a second virtual address space for a second process 112. Typically, in order to utilize shared memory, the MMU may be called upon to map between these two addresses. References to addresses within shared memory may be avoided entirely or must be mapped to a corresponding address space. However, embodiments of the present disclosure may involve a memory management unit that assigns shared memory to equivalent portions of the two address space, such that the aforementioned mapping is not required.

In embodiments, the memory management unit 104 may be an integrated component of the processors 102. The memory management unit 104 may maintain what is sometimes referred to as a page table, which may be a data structure or data structures with records of what portions of a virtual address space have been used, and to which portions of physical memories 106 the portions of virtual address space have been mapped to. A page table is generally held in random access memory or in cache memory. When address translation occurs, the memory management unit will typically first consult a translation lookaside buffer, or other cache structure, to determine the translation has been performed recently and if so, to retrieve the translation from the translation lookaside buffer without the need to consult the page table. However, if no such result is available, the memory management unit may locate an appropriate entry in the page table and use the entry to translate the virtual address to a physical address. Typically, the memory management unit allocates virtual memory on a page-level, such as on four kilobyte boundaries.

In embodiments, the memory management unit 104 may receive messages, signals, or other information indicative of allocating memory. If the memory is to be allocated on behalf of a first process 110 and shared with a second process 112, the message, signal, or other information may include an indication that the memory is to be shared with another process. In some instances, this information may include a reference to the second process 112 indicating that it will be permitted to share access to the memory that is to be allocated on behalf of the first process 110.

The memory management unit 104 in FIG. 1 may, in some instances, comprise circuitry and/or executable instructions for identifying and tracking processes that share memory. For example, the memory management unit 104 may maintain data structures that map shared memory relationships between processes, including those processes which have not yet executed. For example, the memory management unit 104 may maintain a table of active processes. Entries in the table may refer to active processes and may be linked to other active processes which are sharing data or are permitted to share data, and may also refer to processes that would be permitted to access the shared data.

Figure 2:
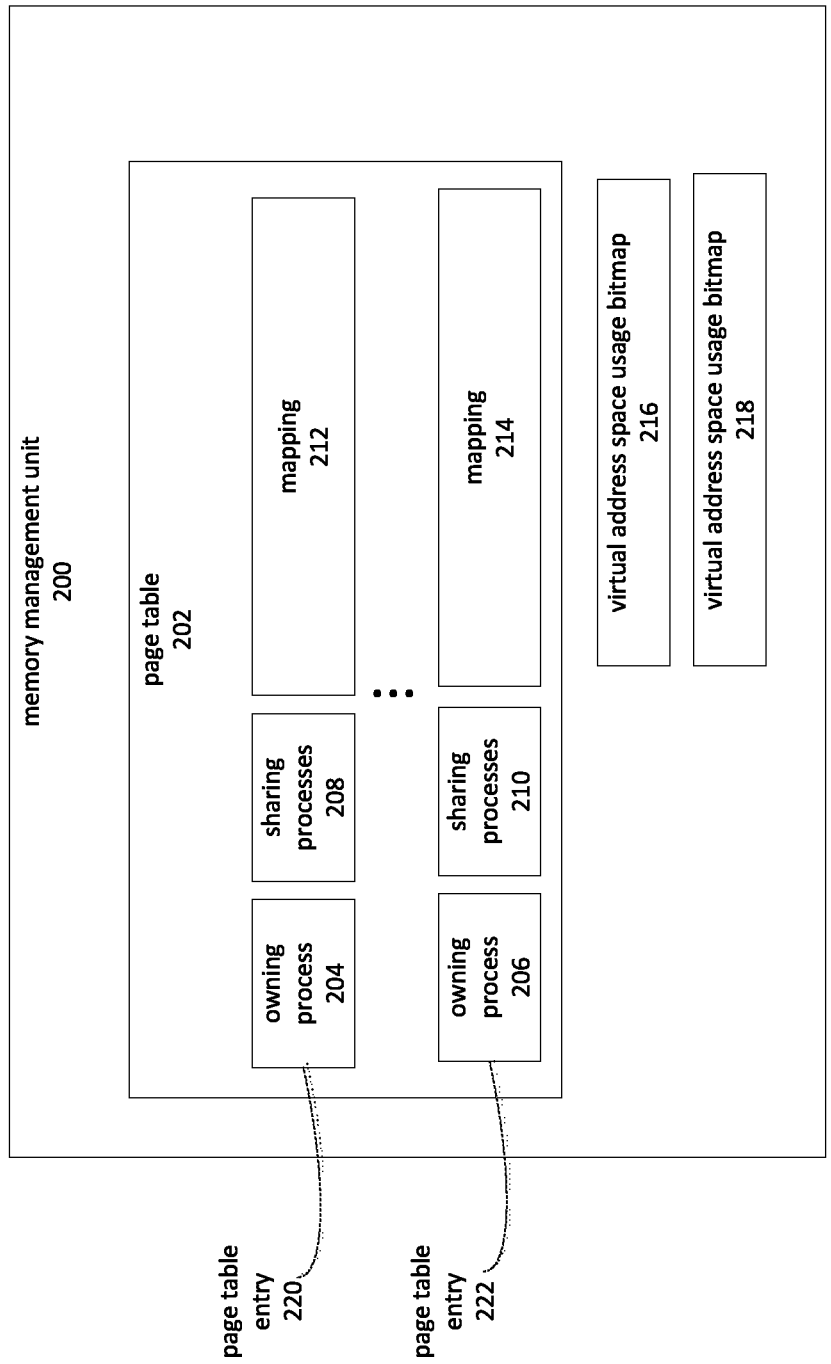
FIG. 2 is a block diagram depicting an example of a memory management unit 200.

FIG. 2 is a block diagram depicting an example of a memory management unit 200. The memory management unit 200 may contain circuitry, logic units, memory, and stored instructions for maintaining a page table 202. The page table 202 may comprise entries indicative of mappings between portions of a process's virtual address space and a corresponding portion of physical memory. For example, a portion of a virtual address space from 0x00A0 to 0x00AF might be mapped to a physical memory address of 0x40A0 to 0x40AF, and the page table 202 might then contain information about the mapping. Note that although the memory management unit may provide a view of shared memory that is contiguous in the virtual address space, the shared memory need not be contiguous in the physical space. In other words, a contiguous range of addresses in the virtual address space may map to a discontinuous set of physical memory pages.

An entry 220 in the page table 202 may comprise a mapping 212 indicating how a region of virtual address space is mapped to a corresponding region of physical memory. The entry 220 may also comprise an owning process 204 indicator and a sharing processes 208 indicator. The owning process indicator 204 may comprise information indicating which process requested the memory. The sharing processes indicator 210 may comprise information indicating which process are permitted to share access to the memory. The page table 202 may comprise additional entries for each mapping between the virtual address space of a process and physical memory. For example, FIG. 2 depicts a second page table entry 222 also comprising an owning process indicator 206, a sharing process indicator 210, and a mapping 214.

The memory management unit may also contain circuitry, logic units, memory, and stored instructions for maintaining virtual address space usage bitmaps 216, 218. These may be a representation of which portions of memory have already been mapped to a physical memory, or are otherwise in use. Upon receiving information indicating that it should allocate a portion of a virtual address space and map the portion to physical memory, the memory management unit 200 may identify which process is requesting the memory and utilize the corresponding virtual address space usage bitmap 216, 218 to determine what regions of the virtual address space are free.

In embodiments, the memory management unit 200 may analyze the virtual address space usage bitmaps 216, 218 for all processes that are to be permitted access to shared memory. This may include the process that is requesting the memory to be allocated as well as any processes that are to be permitted to access the shared memory. The analysis may comprise identifying regions of the virtual address spaces allocated to each process that correspond to each other, are of at least a minimize size defined by the amount of memory being allocated, and are unused in each process. In this regard, correspondence refers to the equivalence of the addresses occupied by the regions. For example, a first region of a first virtual address space may occupy the addresses 0x00A0 to 0x00AF. A second region of a second virtual address space may correspond to the first region if it occupies the range of addresses, in the second virtual address space, of 0x00A0 to 0x00AF.

Figure 3:
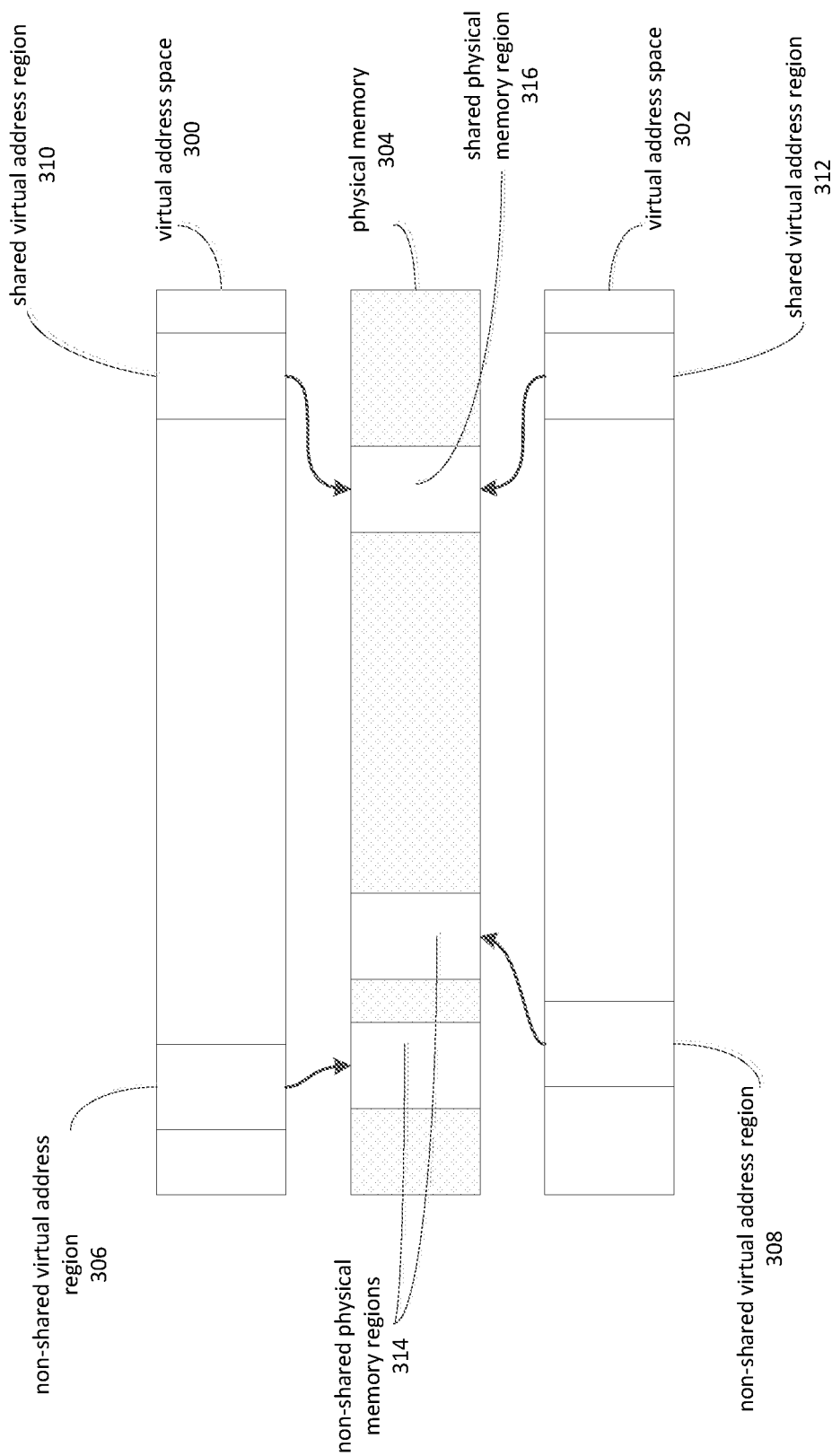
FIG. 3 is a block diagram depicting an example of mapping corresponding regions of a virtual address space to a region of physical memory.

FIG. 3 is a block diagram depicting an example of mapping corresponding regions of a virtual address space to a region of physical memory. The depicted example involves a first virtual address space 300 belonging a first process (not shown), and a second virtual address space 302 belonging to a second process (not shown). Portions of the virtual address spaces 300, 302 are mapped to portions of a physical memory 304.

In the example of FIG. 3, the first process has requested allocation of a private memory portion, corresponding to the non-shared virtual address region 306 of the virtual address space 300. Each of these non-shared virtual address regions 306, 308 is mapped to a separate, non-shared physical memory region 314. As may be seen in FIG. 3, the non-shared virtual address regions 306, 308 may be made independently of each other and do not necessarily overlap or align on any particular boundary. Were these portions of memory to be used for shared memory, references to memory within one region 306 would typically require translation to the address space used for the region 308.

In the example of FIG. 3, the first process has also requested allocation of a portion of memory that is to be shared with the second process. This region has been depicted as a shared virtual address region 310 in FIG. 3. A memory management unit, upon being instructed to reserve a portion of the virtual address space 300 for sharing, has identified a corresponding portion of the second process's virtual address space 302. In FIG. 3, this is depicted as the shared virtual address region 312. The first shared virtual address region 310 and the second shared virtual address region 312 each occupy the same range of addresses in their respective virtual address spaces 300, 302. The shared virtual address region 310 in the first virtual address space 300 may then be mapped, by the memory management unit, to the same shared physical memory region 316 as the shared virtual address region 312. This approach allows each process to access the shared memory in a manner similar to accessing non-shared memory, for example without needing to translate pointers stored within the shared memory to a corresponding address space.

Figure 4:
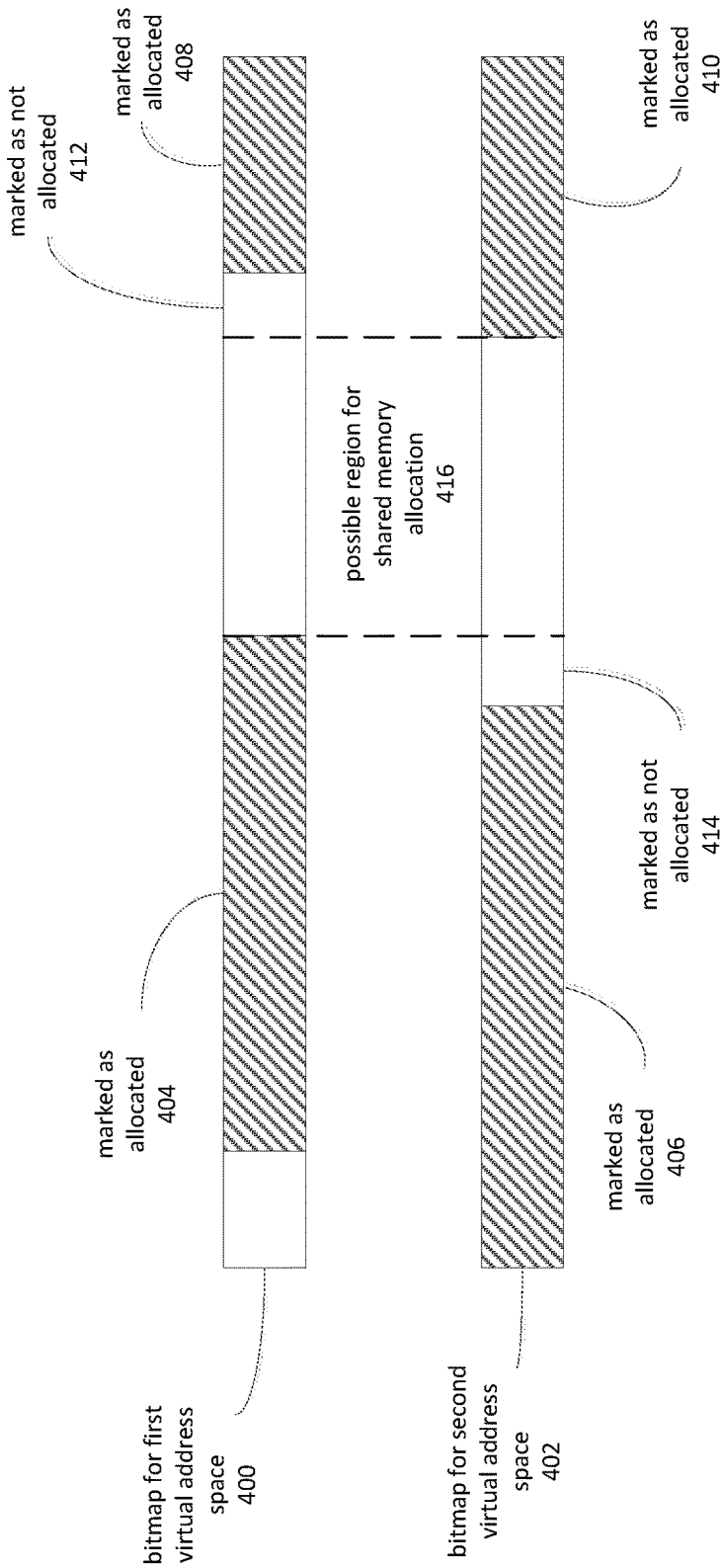
FIG. 4 is a block diagram depicting an example of identifying a virtual address space for shared memory allocation.

FIG. 4 is a block diagram depicting an example of identifying a virtual address space for shared memory allocation. A bitmap, including various representations of bitmaps, may be used to track usage of a processor's address space. For example, a bitmap 400 for a first virtual address space 400 might contains areas that are marked as allocated 404, 408 and areas that are marked as not-allocated 412. A second bitmap 402 for a second address space might have other regions marked as allocated 406, 410 and not allocated 414. In some instances, a bit in a bitmap corresponds to a page of memory in the virtual address space, and a '1' set in the bit indicates that the page has been allocated and a '0' indicates that the page has not yet been, or is not currently, allocated. In some embodiments, a '0' may indicate that the page has been allocated and a '1' may indicate that the page has not yet been, or is not currently, allocated. Here, allocated may refer to the portion of the virtual address space having been reserved for mapping to a physical address, whether or not the mapping has yet to be completed.

As may be seen in FIG. 4, a possible region for shared memory allocation 416 is one in which neither process has allocated memory within corresponding regions marked as not allocated 412, 414. In some instances, this region might be identified by performing a bitwise 'OR' operation on the two bitmaps 400, 402 and inspecting the resulting OR'd bitmap. An address space to use for allocating shared memory may be identified by looking for sequences of '0' in the resulting bitmap, assuming that a '0' is used to represent unallocated pages.

Figure 5:
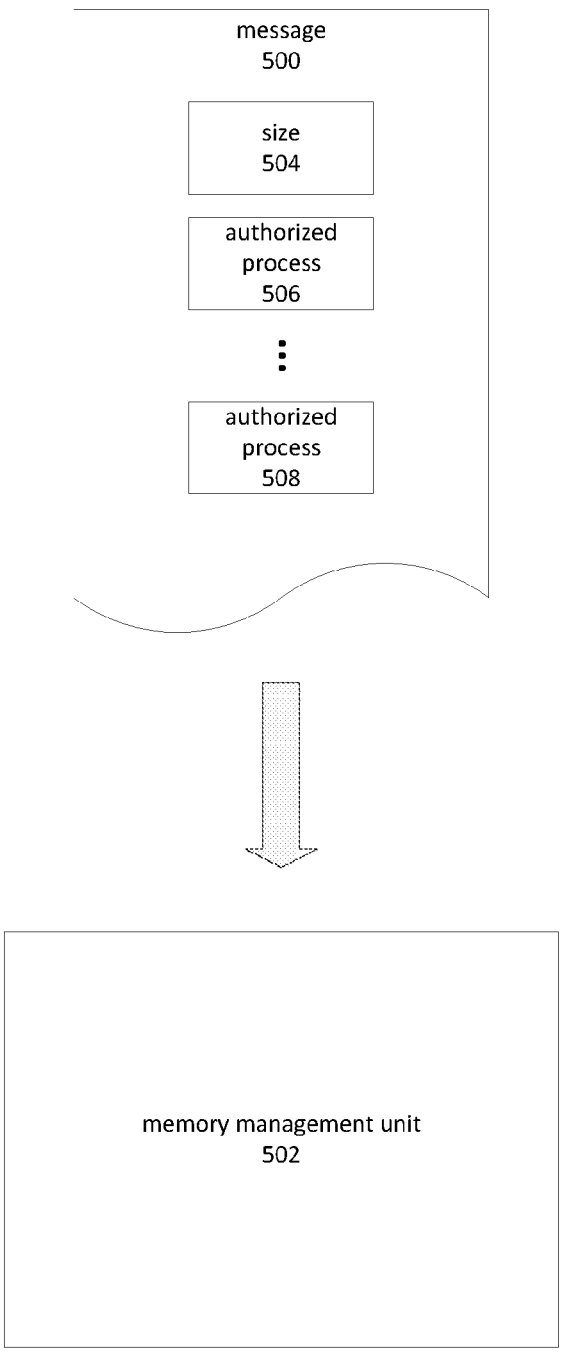
FIG. 5 is a block diagram depicting an example of a message sent to a memory management unit.

FIG. 5 is a block diagram depicting an example of a message sent to a memory management unit. A message 500 may be sent to a memory management unit to indicate that a portion of virtual address space should be allocated and, when appropriate, mapped to physical memory. The message 500 may be received, for example, via a signal line or communication bus between a processor and the memory management unit.

The message 500 may comprise information for allocating shared memory. The message 500 may, for example, comprise a size indicator 504, indicating the minimize size of the virtual address space to be allocated and mapped to physical memory.

The message 500 may further comprise a list of authorized processes 506, 508. The authorized processes 506, 508 are those processes which will be permitted to share access to the corresponding physical memory using corresponding virtual address space regions. In other embodiments, a flag or other mechanism may indicate that the process is opting to share the memory to be allocated or is opting to access a previously shared memory region. Typically, the address space corresponding to each authorized process will be searched so that the physical memory may be mapped to the same corresponding virtual address space in each process.

Figure 6:
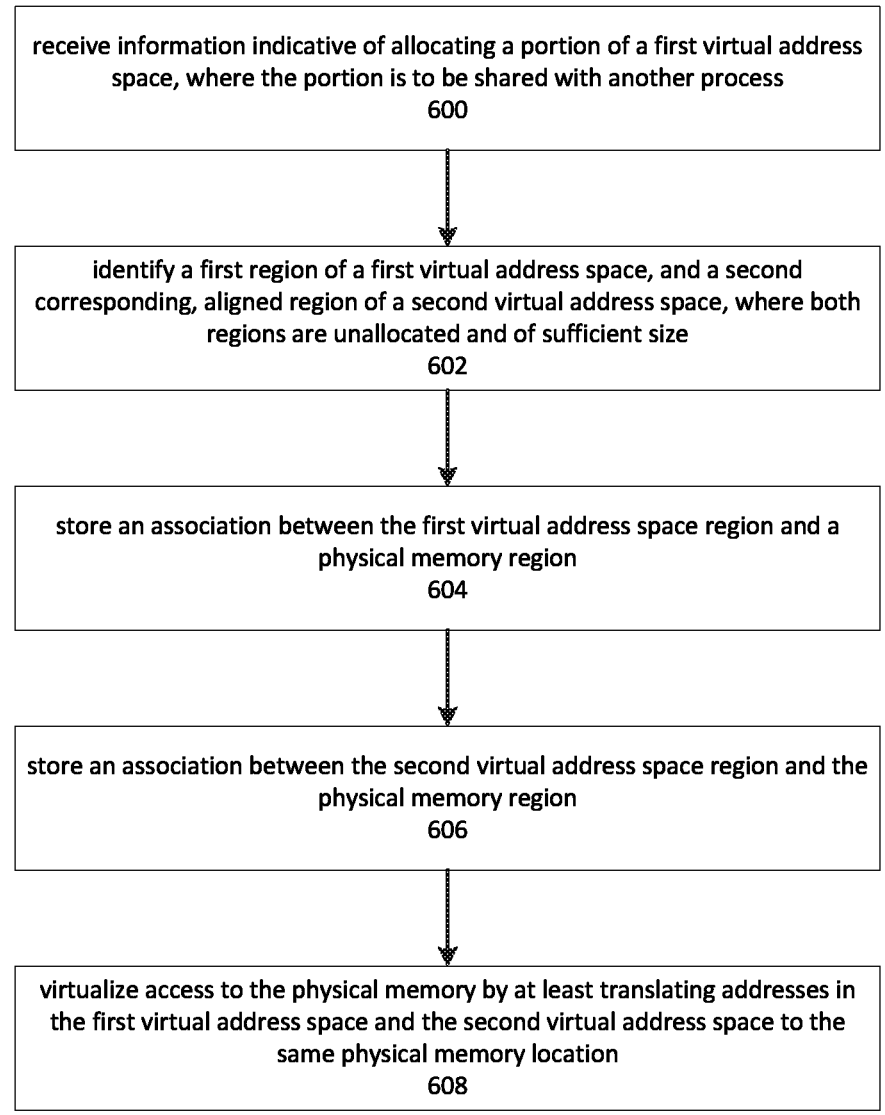
FIG. 6 depicts an example of a process for using a memory management unit for shared memory allocation.

FIG. 6 depicts an example of a process for using a memory management unit for shared memory allocation. Although depicted as a sequence of elements, those of ordinary skill in the art will appreciate that the depicted order should not be construed as limiting the scope of the present disclosure and that at least some of the depicted elements may be altered, omitted, reordered, supplemented with additional elements, or performed in parallel. Embodiments of the depicted process may be implemented using various combinations of computer-executable instructions executed by a computing system, such as the computing systems described herein.

At element 600, a memory management unit may receive information indicative of allocating a portion of a first virtual address space, where the portion is to be shared with another process. The information may be included in a message or other signal sent to the memory management unit to reserve a portion of virtual address space, where the signal includes data that indicates that the reserved portion of memory is intended to be shared with at least one other process. The signal may, in some instances, include a list of process names or other identifiers indicating which specific processes may access the shared memory. In other instances, a flag or other data element may indicate that the memory is to be shared with other, as of yet unspecified, processes.

At element 602, the memory management unit may identify a first region of a first virtual address space and a second corresponding and aligned region of a second virtual address space, where both regions are unallocated and of sufficient size. In other words, the two regions of virtual address space may occupy the same range of virtual addresses. This may, for example, comprise comparing virtual address space allocation bitmaps for each process which is authorized to share the memory that is to be allocated. Portions of the address space, as represented by the bitmaps, that are both unreserved and of sufficient size may be selected to represent the shared memory. The selected address space, as described herein, is used in each of the processes. As such, the processes that are authorized to access the shared memory will not typically utilize the shared address region.

At element 604, the memory management unit may store an association between the first virtual address space and a physical memory region. Embodiments may maintain a page table structure with mappings between virtual addresses and physical memory, such that requests to access virtual addresses may be translated to requests to access the physical memory to which the virtual addresses are mapped. At element 606, the memory management unit may likewise store an association between the second virtual address space and the physical memory region.

At element 608, the memory management unit may virtualize access to the physical memory by at least translating addresses in the first virtual address space and the second virtual address space to the same physical memory location. In other words, the translation performed for either address space is effectively identical. As noted regarding element 604, the translation may involve accessing the page table to identify an entry corresponding to a virtual memory address and determining the physical memory address to which the virtual memory address is mapped.

Figure 7:
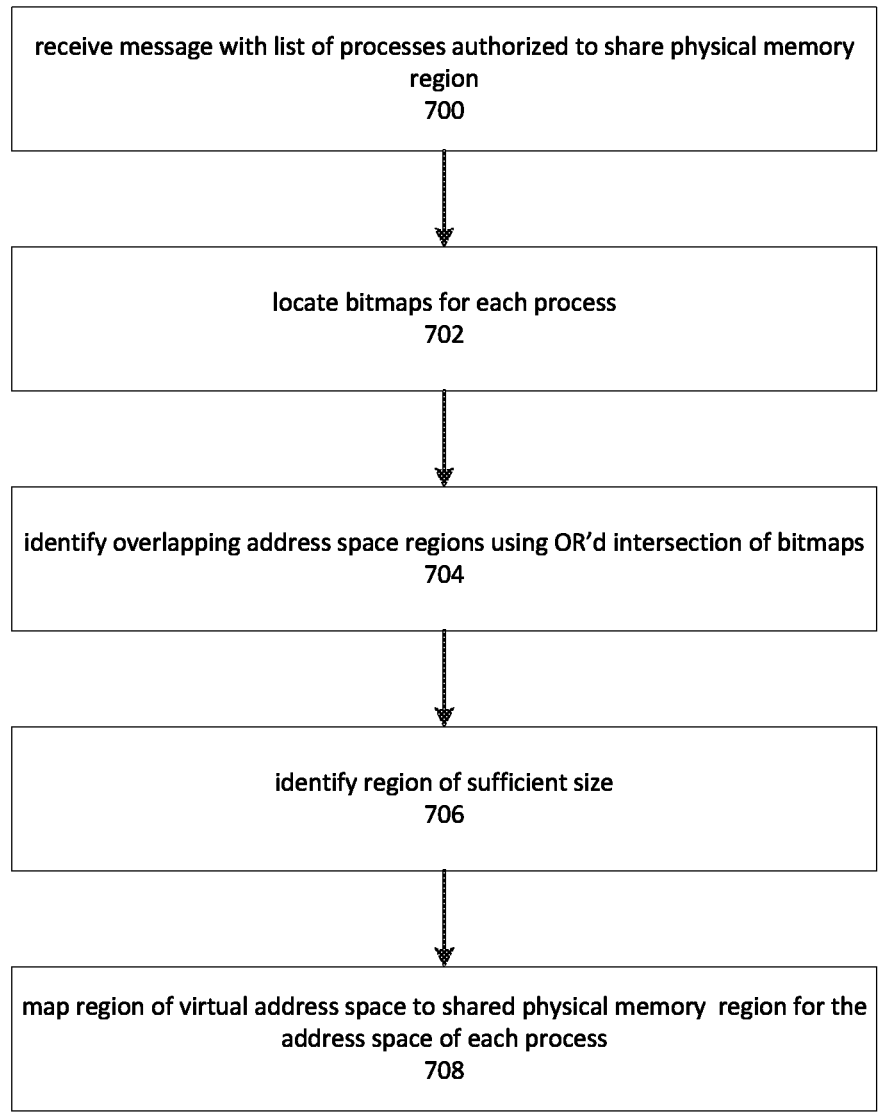
FIG. 7 depicts an example of a process for allocating shared memory by a memory management unit.

FIG. 7 depicts an example of a process for allocating shared memory by a memory management unit. Although depicted as a sequence of elements, those of ordinary skill in the art will appreciate that the depicted order should not be construed as limiting the scope of the present disclosure and that at least some of the depicted elements may be altered, omitted, reordered, supplemented with additional elements, or performed in parallel. Embodiments of the depicted process may be implemented using various combinations of computer-executable instructions executed by a computing system, such as the computing systems described herein.

Element 700 depicts receiving, at a memory management unit, a message indicative of allocated a shared memory region. The message may comprise a list of processes which will be authorized to share a physical memory region. As described herein, each process will have a corresponding region of virtual address space mapped to the same physical memory region. The memory management may maintain a list of process that are sharing access to the physical memory region. The maintenance of the list may comprise adding processes to the list when they begin to share access, and removing processes from the list when they are no longer sharing access. The memory management unit may, in some instances, provide notifications that indicate processes that are beginning to share access to the physical memory, or that an existing process is no longer accessing the shared physical memory.

Element 702 depicts the memory management unit locating a bitmap for each process in the list, as well as for the process that is initiating the request to allocate the memory. For example, referring to FIG. 4, the memory management unit may maintain a bitmap 400, 402 for each executing process. When allocating memory, the bitmaps for those processes that will share access to the physical memory may be identified.

Element 704 depicts that the bitmaps, once identified, may be used to identify overlapping free address space regions. For example, each bit in a bitmap might correspond to a page in the virtual address space, where a '0' means the page is free and a '1' means that the page is allocated. If the bitmaps for each process is logically OR'd together, each '0' in the resulting bitmap is free across all of the processes.

Element 706 depicts that the OR'd bitmap may be used to identify a region of sufficient size. For example, assume that each page is 1 k and that a 4 k memory region is needed. If this was the case, the OR'd bitmap might be examined by the memory management unit to determine where a sequence of four zeroes might be found, since this would represent a 4 k range of addresses in each virtual address space, at a common location.

Element 708 depicts that the identified region of virtual address space may be mapped, for each process, to a common region of physical memory. This may, for example, comprise updating a page table entry for each process to indicate that the region has been allocated and has been mapped to a physical memory region.

In an embodiment, a memory management unit may provide interfaces allowing operating-system access to process and process-sharing information maintained by and/or used by the memory management unit. For example, the memory management unit may be configured to allow read and/or write access to the list of processes that are allowed to access the shared memory.

In an embodiment, a memory management unit may be provided with information pertaining to ongoing usage of the shared memory. This information may be used to determine when a region of shared memory may be recycled. For example, memory may be allocated by the memory management unit on behalf of a first process, and then accessed by a second process. The memory management unit may free the region of virtual address space for reuse when the first process no longer requires access to the shared memory and the second process has terminated, or otherwise no longer requires access.

Figure 8:
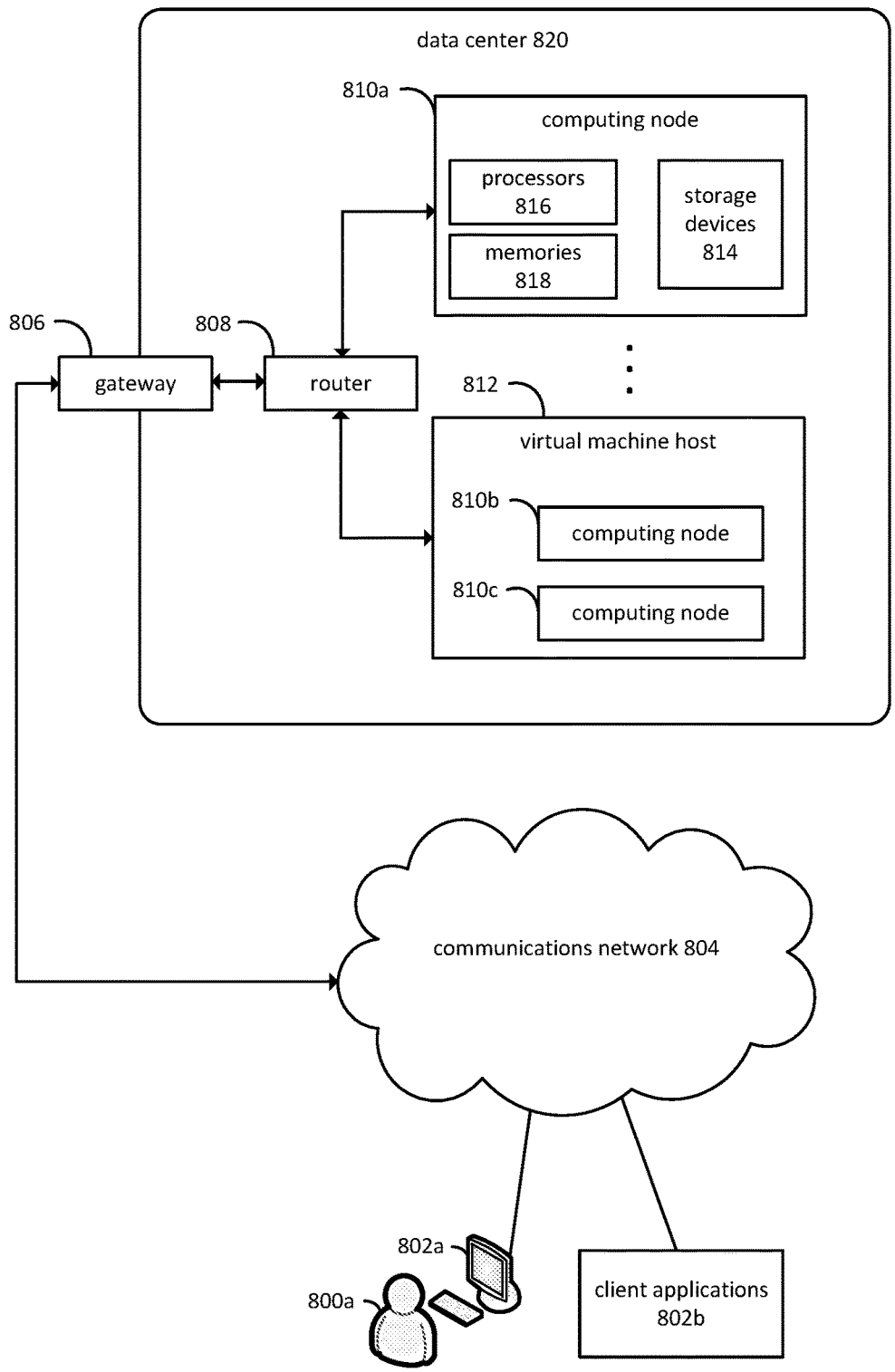
FIG. 8 is a block diagram depicting an embodiment of a computing environment in which aspects of the present disclosure may be practiced.

FIG. 8 is a diagram depicting an example of a distributed computing environment on which aspects of the present invention may be practiced. Various users 800*a* may interact with various client applications, operating on any type of computing device 802*a*, to communicate over communications network 804 with processes executing on various computing nodes 810*a*, 810*b*, and 810*c* within a data center 820. Alternatively, client applications 802*b* may communicate without user intervention. Communications network 804 may comprise any combination of communications technology, including the Internet, wired and wireless local area networks, fiber optic networks, satellite communications, and so forth. Any number of networking protocols may be employed.

Communication with processes executing on the computing nodes 810*a*, 810*b*, and 810*c*, operating within data center 820, may be provided via gateway 806 and router 808. Numerous other network configurations may also be employed. Although not explicitly depicted in FIG. 8, various authentication mechanisms, web service layers, business objects, or other intermediate layers may be provided to mediate communication with the processes executing on computing nodes 810*a*, 810*b*, and 810*c*. Some of these intermediate layers may themselves comprise processes executing on one or more of the computing nodes. Computing nodes 810*a*, 810*b*, and 810*c*, and processes executing thereon, may also communicate with each other via router 808. Alternatively, separate communication paths may be employed. In some embodiments, data center 820 may be configured to communicate with additional data centers, such that the computing nodes and processes executing thereon may communicate with computing nodes and processes operating within other data centers.

Computing node 810*a* is depicted as residing on physical hardware comprising one or more processors 816, one or more memories 818, and one or more storage devices 914. Processes on computing node 810*a* may execute in conjunction with an operating system or alternatively may execute as a bare-metal process that directly interacts with physical resources, such as processors 816, memories 818, or storage devices 814.

Computing nodes 810*b* and 810*c* are depicted as operating on virtual machine host 812, which may provide shared access to various physical resources, such as physical processors, memory, and storage devices. Any number of virtualization mechanisms might be employed to host the computing nodes.

The various computing nodes depicted in FIG. 8 may be configured to host web services, database management systems, business objects, monitoring and diagnostic facilities, and so forth. A computing node may refer to various types of computing resources, such as personal computers, servers, clustered computing devices, and so forth. A computing node may, for example, refer to various computing devices, such as cell phones, smartphones, tablets, embedded device, and so on. When implemented in hardware form, computing nodes are generally associated with one or more memories configured to store computer-readable instructions and one or more processors configured to read and execute the instructions. A hardware-based computing node may also comprise one or more storage devices, network interfaces, communications buses, user interface devices, and so forth. Computing nodes also encompass virtualized computing resources, such as virtual machines implemented with or without a hypervisor, virtualized bare-metal environments, and so forth. A virtualization-based computing node may have virtualized access to hardware resources as well as non-virtualized access. The computing node may be configured to execute an operating system as well as one or more application programs. In some embodiments, a computing node might also comprise bare-metal application programs.

Figure 9:
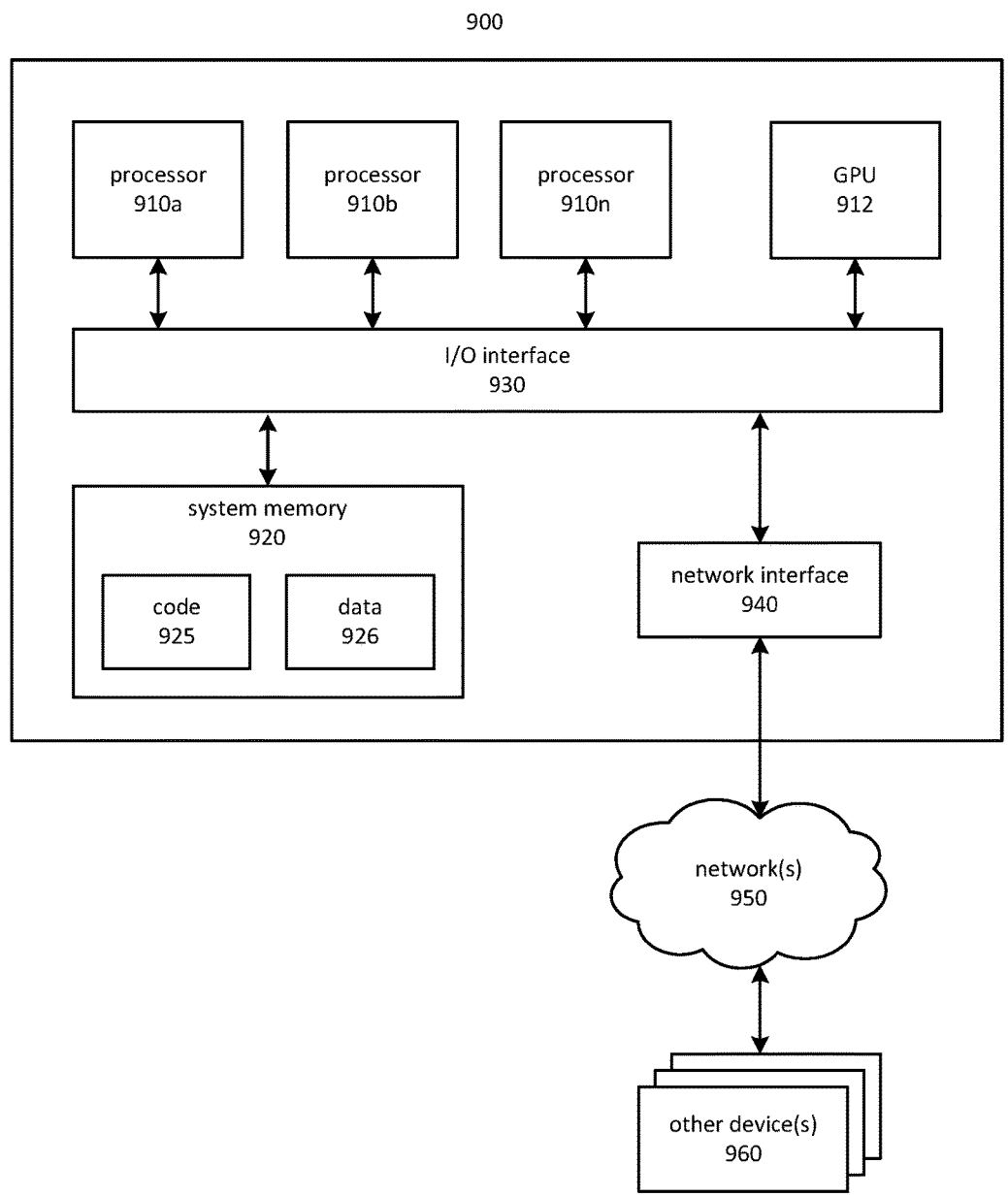
FIG. 9 is a block diagram depicting an embodiment of a computing system on which aspects of the present disclosure may be practiced.

In at least some embodiments, a server that implements a portion or all of one or more of the technologies described herein may include a general-purpose computer system that includes or is configured to access one or more computer-accessible media. FIG. 9 depicts a general-purpose computer system that includes or is configured to access one or more computer-accessible media. In the illustrated embodiment, computing device 900 includes one or more processors 910*a*, 910*b*, and/or 910*n* (which may be referred herein singularly as a processor 910 or in the plural as the processors 910) coupled to a system memory 920 via an input/output ("I/O") interface 930. Computing device 900 further includes a network interface 940 coupled to I/O interface 930.

In various embodiments, computing device 900 may be a uniprocessor system including one processor 910 or a multiprocessor system including several processors 910 (e.g., two, four, eight, or another suitable number). Processors 910 may be any suitable processors capable of executing instructions. For example, in various embodiments, processors 910 may be general-purpose or embedded processors implementing any of a variety of instruction set architectures ("ISAs"), such as the x86, PowerPC, SPARC or MIPS ISAs, or any other suitable ISA. In multiprocessor systems, each of processors 910 may commonly, but not necessarily, implement the same ISA.

In some embodiments, a graphics processing unit ("GPU") 1012 may participate in providing graphics rendering and/or physics processing capabilities. A GPU may, for example, comprise a highly parallelized processor architecture specialized for graphical computations. In some embodiments, processors 910 and GPU 912 may be implemented as one or more of the same type of device.

System memory 920 may be configured to store instructions and data accessible by processor(s) 910. In various embodiments, system memory 920 may be implemented using any suitable memory technology, such as static random access memory ("SRAM"), synchronous dynamic RAM ("SDRAM"), nonvolatile/Flash®-type memory, or any other type of memory. In the illustrated embodiment, program instructions and data implementing one or more desired functions, such as those methods, techniques, and data described above, are shown stored within system memory 920 as code 925 and data 926.

In one embodiment, I/O interface 930 may be configured to coordinate I/O traffic between processor 910, system memory 920, and any peripherals in the device, including network interface 940 or other peripheral interfaces. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect ("PCI") bus standard or the Universal Serial Bus ("USB") standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computing device 900 and other device or devices 960 attached to a network or networks 950, such as other computer systems or devices, for example. In various embodiments, network interface 940 may support communication via any suitable wired or wireless general data networks, such as types of Ethernet networks, for example. Additionally, network interface 940 may support communication via telecommunications/telephony networks, such as analog voice networks or digital fiber communications networks, via storage area networks, such as Fibre Channel SANs (storage area networks), or via any other suitable type of network and/or protocol.

In some embodiments, system memory 920 may be one embodiment of a computer-accessible medium configured to store program instructions and data as described above for implementing embodiments of the corresponding methods and apparatus. However, in other embodiments, program instructions and/or data may be received, sent, or stored upon different types of computer-accessible media. Generally speaking, a computer-accessible medium may include non-transitory storage media or memory media, such as magnetic or optical media, e.g., disk or DVD/CD coupled to computing device 900 via I/O interface 930. A non-transitory computer-accessible storage medium may also include any volatile or non-volatile media, such as RAM (e.g., SDRAM, DDR SDRAM, RDRAM, SRAM, etc.), ROM, etc., that may be included in some embodiments of computing device 900 as system memory 920 or another type of memory. Further, a computer-accessible medium may include transmission media or signals, such as electrical, electromagnetic or digital signals, conveyed via a communication medium, such as a network and/or a wireless link, such as those that may be implemented via network interface 940. Portions or all of multiple computing devices, such as those illustrated in FIG. 9, may be used to implement the described functionality in various embodiments; for example, software components running on a variety of different devices and servers may collaborate to provide the functionality. In some embodiments, portions of the described functionality may be implemented using storage devices, network devices or special-purpose computer systems, in addition to or instead of being implemented using general-purpose computer systems. The term "computing device," as used herein, refers to at least all these types of devices and is not limited to these types of devices.

A compute node, which may be referred to also as a computing node, may be implemented on a wide variety of computing environments, such as tablet computers, personal computers, smartphones, game consoles, commodity-hardware computers, virtual machines, web services, computing clusters, and computing appliances. Any of these computing devices or environments may, for convenience, be described as compute nodes or as computing nodes.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment, and the like, needed to implement and distribute the infrastructure and web services offered by the provider network. The resources may in some embodiments be offered to clients in various units related to the web service, such as an amount of storage capacity for storage, processing capability for processing, as instances, as sets of related services, and the like. A virtual computing instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor).

A number of different types of computing devices may be used singly or in combination to implement the resources of the provider network in different embodiments, including general-purpose or special-purpose computer servers, storage devices, network devices, and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines ("JVMs"), general-purpose or special-purpose operating systems, platforms that support various interpreted or compiled programming languages, such as Ruby, Perl, Python, C, C++, and the like, or high-performance computing platforms) suitable for the applications, without, for example, requiring the client to access an instance or an execution platform directly. A given execution platform may utilize one or more resource instances in some implementations; in other implementations multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources, and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server, or some combination of the two. Various types and configurations of instances may be made available, including different sizes of resources executing different operating systems ("OS") and/or hypervisors, and with various installed software applications, runtimes, and the like. Instances may further be available in specific availability zones, representing a logical region, a fault tolerant region, a data center, or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Each of the processes, methods, and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage, such as, e.g., volatile or non-volatile storage.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A system, comprising:
   a computing device comprising one or more processors, one or more memories, and a memory management unit, wherein the one or more processors perform instructions stored in the one or more memories, causing the computing device to at least:
   receive, at the memory management unit, information indicative of allocating a portion of a first virtual address space of a first process executing on the computing device, the portion of a minimum size, wherein the information comprises data indicative of sharing data with a second process;
   identify a first region of the first virtual address space and a second region of a second virtual address space, wherein the first region is at least the minimum size and is unallocated, wherein the second region is at least the minimum size and is unallocated, and wherein addresses of the first region in the first virtual address space are equivalent to addresses of the second region in the second virtual address space; and
   virtualize access to a physical memory region corresponding to the first region of the first virtual address space and the second region of the second virtual address space, wherein virtualizing access comprises translating an address in the first region of the first virtual address space to a location in the physical memory and translating an equivalent address in the second region of the second virtual address space to the location.

2. The system of claim 1, wherein the one or more processors perform further instructions stored in the one or more memories, causing the computing device to at least:
   identify the first region by at least comparing a first bitmap representation of the first virtual address space to a second bitmap representation of the second virtual address space, wherein values of bits in the first and second bitmaps are indicative of allocated virtual addresses.

3. The system of claim 1, wherein the one or more processors perform further instructions stored in the one or more memories, causing the computing device to at least:
   store information indicative of the first region being allocated in the first virtual address space and store information indicative of the second region being allocated in the second virtual address space.

4. The system of claim 1, wherein the one or more processors perform further instructions stored in the one or more memories, causing the computing device to at least:
   maintain, by the memory management unit, a list of processes sharing access to the physical memory region.

5. The system of claim 1, wherein the memory management unit maintains a page table comprising information indicative of the first region of virtual memory being mapped to the physical memory region and the physical memory being shared with the second process.

6. A method, comprising:
   receiving information indicative of allocating a portion of a first virtual address space of a first process, the portion of a minimum size, wherein the information comprises data indicative of sharing data with a second process;
   identifying a first region of the first virtual address space and a second region of a second virtual address space, wherein the first region is at least the minimum size and is unallocated, wherein the second region is at least the minimum size and is unallocated, and wherein addresses of the first region correspond to addresses of the second region; and
   translating an address in the first region of the first virtual address space to a location in a physical memory and translating an equivalent address in the second region of the second virtual address space to the location in the physical memory.

7. The method of claim 6, further comprising:
   comparing a first bitmap representation of the first virtual address space to a second bitmap representation of the second virtual address space, wherein values of bits in the first and second bitmaps are indicative of allocated virtual addresses.

8. The method of claim 6, further comprising:
   storing information indicative of the first region being allocated in the first virtual address space and storing information indicative of the second region being allocated in the second virtual address space.

9. The method of claim 6, further comprising:
   maintaining a list of processes sharing access to the physical memory; and
   sending a notification to processes in the list of processes, the notification comprising at least one of information indicative of an additional process sharing access to the physical memory or information indicative of a process no longer accessing the shared physical memory.

10. The method of claim 6, further comprising:
    maintaining a page table comprising information indicative of the first region of the virtual address space being mapped to the physical memory and the physical memory being shared with the second process.

11. The method of claim 6, wherein the information indicative of allocating the portion of the first virtual address space comprises a list of processes permitted to share access to data to be stored in the portion of the first virtual address space.

12. The method of claim 6, wherein the physical memory assigned to the first and second virtual regions of virtual address space is discontinuous.

13. The method of claim 6, further comprising:
    receive, from a memory management unit, information indicative of allocated portions of the first virtual address space and information indicative of allocated portions of the second virtual address space; and
    send, to the memory management unit, information indicative of mapping the first region of the first virtual address space and the second region of the second virtual address space to the physical memory.

14. A non-transitory computer-readable storage medium having stored thereon executable instructions that, upon execution by a computing device, cause the computing device at least to:
    receive information indicative of allocating a portion of a first virtual address space of a first process, the portion of a minimum size, wherein the information comprises data indicative of sharing data with a second process;

identify a first region of the first virtual address space and a second region of a second virtual address space, wherein the first region is at least the minimum size and is unallocated, wherein the second region is at least the minimum size and is unallocated, and wherein addresses of the first region in the first virtual address space correspond to addresses of the second region in the second virtual address space; and virtualize access to a physical memory region corresponding to the first region of the first virtual address space and the second region of the second virtual address space, wherein virtualizing access comprises translating a first address in the first region and a corresponding second address in the second region to a same location in physical memory.

15. The non-transitory computer-readable storage medium of claim 14, comprising further instructions that, upon execution, cause the computing device to at least:

perform a logical OR operation between a first bitmap representation of the first virtual address space and a second bitmap representation of the second virtual address space, wherein a result of the logical OR operation is indicative of corresponding unallocated regions of virtual address space.

16. The non-transitory computer-readable storage medium of claim 14, comprising further instructions that, upon execution, cause the computing device to at least:

store information indicative of the first region being allocated in the first virtual address space and store information indicative of the second region being allocated in the second virtual address space.

17. The non-transitory computer-readable storage medium of claim 14, wherein the information indicative of allocating a portion of a first virtual address space comprises a list of processes permitted to access a corresponding region of physical memory.

18. The non-transitory computer-readable storage medium of claim 14, comprising further instructions that, upon execution, cause the computing device to at least:

add, to a page table, information indicative of the first region of the first virtual address space being mapped to the physical memory region and the physical memory being sharable with the second process.

19. The non-transitory computer-readable storage medium of claim 14, wherein the physical memory region is discontiguous.

20. The non-transitory computer-readable storage medium of claim 14, comprising further instructions that, upon execution, cause the computing device to at least:

receive, from a memory management unit, information indicative of allocated portions of the first virtual address space and information indicative of allocated portions of the second virtual address space; and send, to the memory management unit, information indicative of mapping the first region of virtual address space and the second region of virtual address space to the physical memory region.

* * * * *